United States Patent
Tamatsu

(10) Patent No.: US 6,445,335 B1
(45) Date of Patent: Sep. 3, 2002

(54) METHOD OF DETECTING A RADAR CHARACTERISTIC, A RADAR CHARACTERISTIC, DETECTION APPARATUS, AND A RECORDING MEDIUM RECORDING DATA FOR DETECTING A RADAR CHARACTERISTIC

(75) Inventor: Yukimasa Tamatsu, Okazaki (JP)

(73) Assignee: Denso Corporation, Kariya (JP)

( * ) Notice: Subject to any disclaimer, the term of this patent is extended or adjusted under 35 U.S.C. 154(b) by 105 days.

(21) Appl. No.: 09/707,842

(22) Filed: Nov. 8, 2000

(30) Foreign Application Priority Data

Nov. 10, 1999 (JP) .......................................... 11-319737

(51) Int. Cl.⁷ ................................................ G01S 7/40
(52) U.S. Cl. ............................. 342/70; 342/71; 342/72; 342/91; 342/173; 342/174
(58) Field of Search .............................. 342/70, 71, 72, 342/89, 91, 93, 118, 165, 173, 174, 175, 195

(56) References Cited

U.S. PATENT DOCUMENTS

| | | | |
|---|---|---|---|
| 4,224,620 A | * 9/1980 | Seiersen | 342/90 |
| 4,980,633 A | * 12/1990 | Roskoni | 342/115 |
| 6,035,053 A | * 3/2000 | Yoshioka et al. | 382/104 |
| 6,064,942 A | * 5/2000 | Johnson et al. | 701/213 |
| 6,201,642 B1 | * 3/2002 | Bos | 359/565 |

FOREIGN PATENT DOCUMENTS

| | | | |
|---|---|---|---|
| DE | 10055457 A | * | 5/2001 |
| JP | 6-75048 | | 3/1994 |
| JP | 11-94946 | | 4/1999 |
| JP | 11-109030 | | 4/1999 |

* cited by examiner

Primary Examiner—John B. Sotomayor
(74) Attorney, Agent, or Firm—Law Offices of David G. Posz

(57) ABSTRACT

A radar wave reflected by a preceding automotive vehicle is received. The distance and the reception level of the received radar wave are repeatedly stored with relation therebetween. The reception levels are plotted with respect to distance. The distribution of the receptions levels is approximated with a linear equation as the characteristic of the radar apparatus. Variation in the distribution, that is, Y intercept of the linear equation represents the variation of the characteristic of the radar apparatus. A reference characteristic of the radar is measured with changing the distance to the preceding reflective object and the measured characteristic is measured with a moving preceding vehicle during actual traveling. The reference Y intercept is compared with the measured Y intercept to detect the deviation. Further, the divination amount or the measured value is classified to judge the cause of decries in the characteristic using conditional signals.

17 Claims, 12 Drawing Sheets

METHOD OF DETECTING A RADAR CHARACTERISTIC, A RADAR CHARACTERISTIC, DETECTION APPARATUS, AND A RECORDING MEDIUM RECORDING DATA FOR DETECTING A RADAR CHARACTERISTIC

BACKGROUND OF THE INVENTION

1. Field of the Invention

This invention relates to a method of detecting a characteristic of a radar apparatus for a vehicle, a radar characteristic detection apparatus, and a recording medium recording the method of detecting a characteristic of a radar.

2. Description of the Prior Art

A radar characteristic detection apparatus that detects a deterioration degree in the characteristic of the radar apparatus is known. Japanese patent application provisional publication No. 11-109030 discloses such a radar apparatus. In this apparatus, the deterioration degree is detected by comparing the magnitude of the reflection wave detected by a load surface reflection wave detection means with a predetermined threshold value.

SUMMARY OF THE INVENTION

The aim of the present invention is to provide a superior radar apparatus for a vehicle, a superior radar characteristic detection apparatus, and a superior recording medium recording the method of detecting a characteristic of a radar.

According to the present invention, a first aspect of the present invention is a method of detecting a characteristic of a radar apparatus for a vehicle on the basis of data of an object obtained by said radar apparatus, said data including distance data of said object and a level of a radar signal reflected by said object and received by said radar apparatus, comprising the steps of: (a) repeatedly storing said distance data to said object and said level of said radar signal with relation therebetween; and (b) detecting said characteristic of said radar apparatus from variation in distribution of said repeatedly stored distance data and levels of said radar signal.

Preferably, the method as mentioned above, further comprises the step of: (c) detecting variation of said characteristic of said radar apparatus by comparing said distribution with a reference distribution. In this case, the steps of: effecting said steps (a) and (b); and storing said distribution as said reference distribution may be further included.

Moreover, the method may further comprise the step of: generating a control signal in accordance with said detected characteristic. Moreover, the method may be further comprise the steps of: detecting a peak level of spread spectrum and comparing said peak level with a threshold value to detect said object; detecting a relative speed of said object when said peak level is higher than said threshold value; determining whether said data of said object is subjected to said steps (a) and (b) in accordance with the result of said step of detecting said peak level.

According to the present invention, a second aspect of the present invention is a radar apparatus characteristic detection apparatus detecting a characteristic of a radar apparatus for a vehicle on the basis of data of an object obtained by said radar apparatus, said data including distance data of said object and a level of a radar signal reflected by said object and received by said radar apparatus, comprising: storing means for repeatedly storing said distance data and said level with relation therebetween; and detecting means for detecting said characteristic of said radar apparatus from variation in distribution of said repeatedly stored distance data and levels.

Preferably, the radar apparatus characteristic detection apparatus further comprises: variation detection means for detecting variation of said characteristic of said radar apparatus, wherein said variation detection means includes comparing means for comparing said distribution with a reference distribution. In this case, means for determining a characteristic curve in accordance with said distribution and said comparing means comparing said distribution with a reference characteristic curve may be further included. Moreover, approximating means for approximating said distribution to provide a liner equation may be further included. Moreover, calculation means for calculating an intercept of said linear equation and a reference intercept of a reference linear equation of said reference distribution may be further included, wherein said comparing means compares said intercept with said reference intercept.

Preferably, the radar apparatus characteristic detection apparatus further comprises: input means for inputting a signal from said vehicle. Moreover, the radar apparatus characteristic detection apparatus may further comprise: judging means for judging whether said variation of said characteristic of said radar apparatus is caused by the radar apparatus itself or an external reason in accordance with said signal inputted from said vehicle.

Preferably, the radar apparatus characteristic detection apparatus further comprise: judging means for judging that the object is moving in accordance with data from said radar and said storing means and said detection means are operated when said object is judged to be moving.

Preferably, the radar apparatus characteristic detection apparatus further comprises: recognizing means for recognizing said object in accordance with said data from said radar with a threshold value, and changing means for changing said threshold value when variation of said characteristic of said radar apparatus is detected.

Preferably, the radar apparatus characteristic detection apparatus further comprises: generating and outputting means for generating and outputting a mode control signal when said second detecting means detects said variation.

According to the present invention, a third aspect of the present invention is a recording medium for recording processing in detecting a characteristic of a radar apparatus for a vehicle on the basis of data of an object obtained by said radar apparatus, said data including distance data of said object and a level of a radar signal reflected by said object and received by said radar apparatus, said processing including the steps of: (a) repeatedly storing said distance data to said object and said level of said radar signal with relation therebetween; and (b) detecting said characteristic of said radar apparatus from variation in distribution of said repeatedly stored distance data and levels of said radar signal.

Preferably, in the recording medium, said processing further comprising the step of: (c) detecting variation of said characteristic of said radar apparatus by comparing said distribution with a reference distribution.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described embodiments of a method of detecting characteristics of a radar apparatus for an automotive vehicle, a radar characteristic detection apparatus, and a recording medium recording the method of detecting a characteristic of a radar according to this invention with reference to drawings.

First Embodiment

Figure 3:
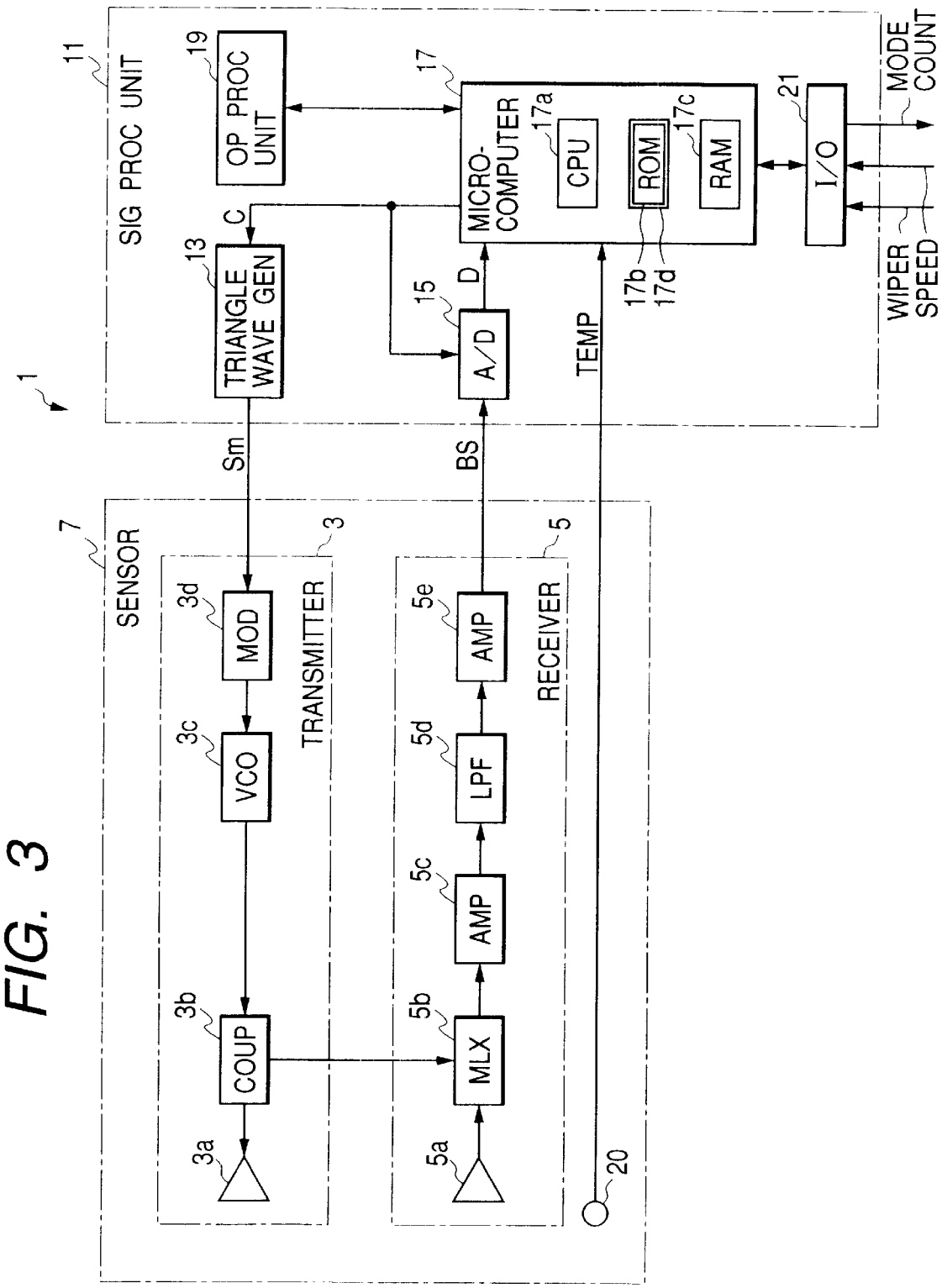
FIG. 3 is a block diagram illustrating an outline structure of a reader apparatus according to a first embodiment of the present invention.

FIG. 3 shows an outline structure of an FMCW (frequency modulated continuous wave) radar apparatus 1 according to the present invention.

As shown in FIG. 3, the radar apparatus 1 includes a sensor (transmitting and receiving unit) 7 and a signal processing unit 11. The sensor 7 includes a transmitter 3 for transmitting a radar wave of which frequency is modulated in accordance with a modulation signal (triangle waveform) Sm, a receiver 5 for receiving the radar wave reflected by an object, and a thermal sensor for measuring the temperature of the sensor 7.

The radar apparatus 1 detects an object in front of the automotive vehicle mounting the radar apparatus 1. The sensor 7 is mounted at the front portion of the automotive. The signal processing unit 11 is mounted on a room of the automotive vehicle or near the room.

The signal processing unit 11 supplies the modulation signal Sm to the transmitter 3, receives a beat signal BS from the receiver 5, and detects the presence, a distance, and a speed of the object and further detects characteristic variation of the radar apparatus 1.

The transmitter 3 includes a modulator 3d, a voltage controlled oscillator (VCO) 3c, a power distributor 3b, and a transmission antenna 3a. The modulator (MOD) 3d converts the modulation signal Sm to a frequency control signal for the voltage controlled oscillator 3c. The voltage controlled oscillator 3c generates a high frequency signal of millimeter band to output a transmission signal. The power distributor (COUP) 3 distributes the transmission signal to the transmission antenna 3a and to the receiver 5 as a local signal with power distribution controlled.

The frequency of the output of the voltage controlled oscillator 3c is controlled in accordance with the frequency control signal having a triangle waveform from the modulator 3d, that is, the frequency of the output of the voltage controlled oscillator 3c successively increases and then decreases. The transmission antenna 3a radiates (transmits) radar waves in accordance with the transmission signal.

The receiver 5 includes a receiving antenna 5a for receiving the reflected radar wave, a mixer for mixing the received signal from the receiving antenna 5a with the local signal from the power distributor 3d, a preamplifier 5c for amplifying the output of the mixer 5b, a low pass filter 5d for removing unnecessary high frequency components from the output of the preamplifier 5c and extracting a difference frequency component between the local signal (the transmitting signal) and the receiving signal, that is, the beat signal BS, and a post-amplifier 5e for amplifying the beat signal BS to have a necessary signal level.

The signal processing unit 11 includes a triangle wave generator 13 actuated in response to an actuation signal C for generating the modulation signal Sm of which waveform is triangle, an a/d converter 15 for converting the beat signal BS from the receiver 5 into digital data D, a microcomputer 17 having a CPU (central processing unit) 17a, a ROM (Read Only Memory) and a RAM (Random Access Memory) 17c, an operation processing unit 19, and an input and output circuit 21 for inputting signal from the automotive vehicle mounting the radar apparatus 1 or the other units in the automotive vehicle and outputting a mode control signal and other control signals. The microcomputer 17, the operation processing unit 19, and the I/O 21 acts as the radar characteristic detection apparatus which is included in the radar apparatus 1.

The ROM 17b is mounted on the circuit board of the microcomputer 17 with a socket 17b, so that the ROM acts as a recording medium for supplying the program used in the radar apparatus 1. The recording medium may be provided with other actual medium, such as a floppy disc, an optical disc, an optomagnetic disc with its disc drive.

The microcomputer 17 detects existence of the object (recognizes the object), a distance, a relative speed, an azimuth of an object. Moreover, the microcomputer 17 further detects whether the object is moving, and detects the variation in characteristic of the radar apparatus 1 in accordance with the data D.

The a/d converter 15 starts its operation in response to the actuation signal C and then, a/d-converts the beat signal BS into the digital data D every predetermined interval. The data D is written in the RAM 17c at a predetermined area. The CPU 17a counts the times of a/d-converting from the start. When the a/d converter 15 finishes the a/d converting the predetermined times, the CPU 17a sets an end flag in the RAM 17c and finishes the operation of this cycle.

The triangle generator 13 is activated in response to the activation signal C and thus, the modulation signal Sm is supplied to the voltage controlled oscillator 3c. Then, the voltage controlled oscillator 3c increases the frequency of its output at a predetermined rate in accordance with ascent of the triangle waveform (this interval is referred to as ascent portion), and decreases its frequency in accordance with the descent of the triangle waveform (this interval is referred to as a descent portion). Thus, the voltage controlled oscillator 3c generates the modulated transmission signal.

The transmitter 3 transmits the radar wave in accordance with the transmission signal. The transmitted radar wave is reflected by an object and the background. The reflected radar wave is received by the receiving antenna 5a in the receiver 5. The reception signal is mixed with the local signal from the power distributor 3b to generate the beat signal BS. The reception signal is delayed from the transmission signal by the interval for which the radar wave goes to and from the object. Moreover, if the object moves relatively to the radar apparatus 1, the reflected radar wave is subjected to Doppler shift. Thus, the beat signal BS includes the delay component fr and the Doppler component fd.

The beat signal BS is converted into the digital data D by the a/d converter 15 and is sequentially stored in the RAM 17c every data block.

The data stored in the data blocks are processed by the microcomputer 17 and the operation processing unit 19. The processed data are used for detecting (recognizing) the object and detecting the characteristic variation of the radar apparatus 1. The ROM 17b stores program data and other data for the basic radar apparatus functions and the program data and other data as the radar apparatus characteristic detection apparatus in corporation with the CPU 17a and the RAM, and the operation processing unit 19.

The microcomputer 17 and the operation processing unit 19 obtain spectrum from the data D from the RAM 17c using Fast Fourier Transform and detect peaks to detect remarkable objects showing a peak level exceeding a threshold value TH. The microcomputer 17 detects a target object of which speed to the road is other than the speed indicated by the speed signal from this automotive vehicle. That is, the microcomputer 17 recognizes the target object which is traveling on the road and relative speed to this automotive is essentially not zero. Then the microcomputer 17 detects the distance and the reception levels of the received signal to detect the characteristic variation of the radar apparatus 1.

The principle and the basic technique for detecting the characteristic variation of the radar apparatus 1 will be described.

At first, prior to detecting the characteristic variation during traveling, a reference characteristic is obtained in advance.

That is, the radar apparatus 1 transmits the radar wave toward an object (a reflector on an automotive vehicle) and receives the reflected radar wave. Then, the distance to the object is changed and the data is detected again. This operation is repeated a plurality of times to obtain a plurality of sets of data, wherein the receptions signal levels are stored with relation to the distances.

Figure 1:
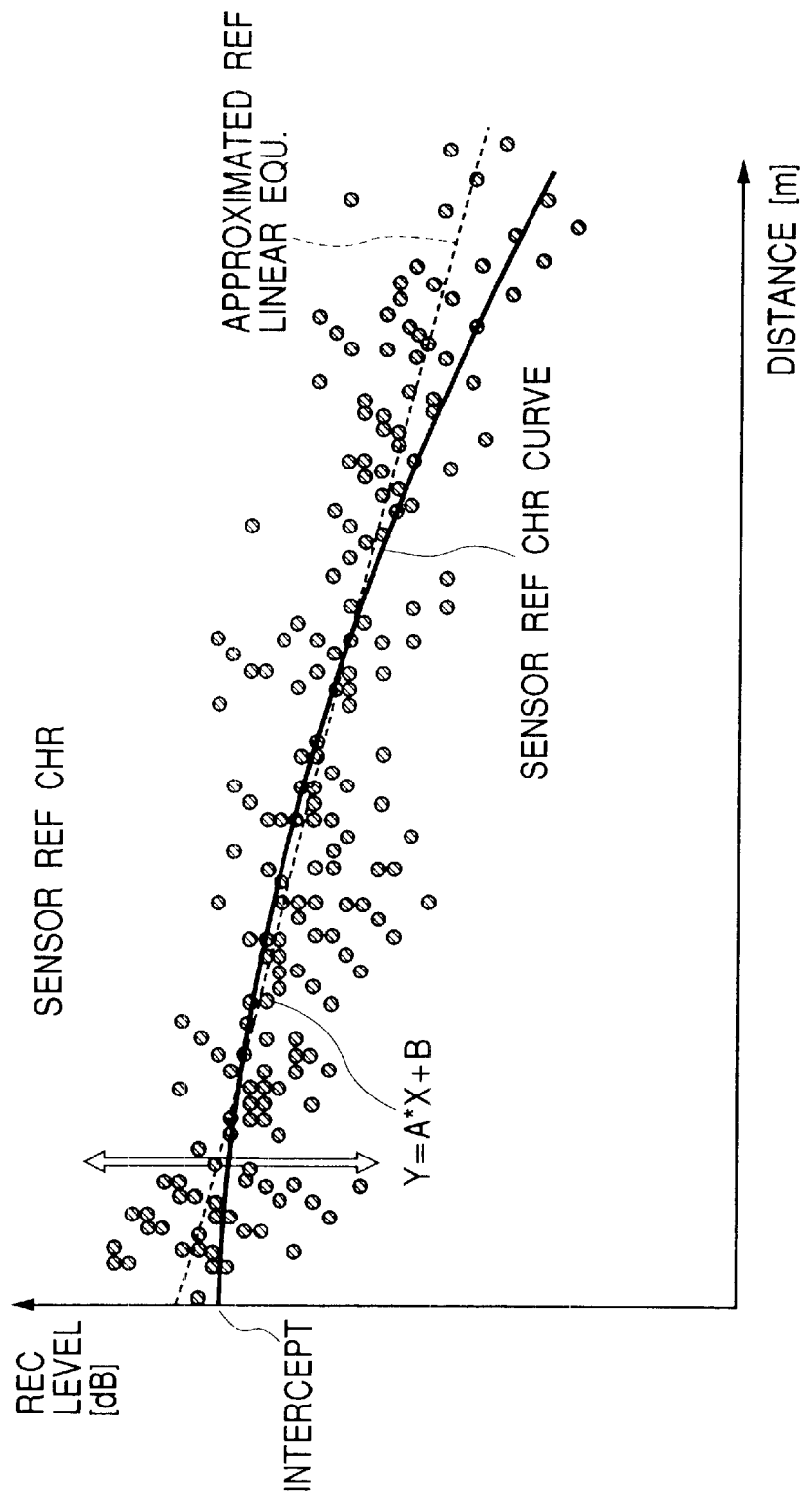
FIG. 1 is a graphical drawing illustrating operation for obtaining a sensor reference characteristic according to the present invention.

The data are plotted as shown in FIG. 1 with filtering values adjusted. Thus, the sensor reference characteristic (characteristic curve of the reference characteristic) is provided as shown by the solid line. This technique for determining the characteristic curve is well known. For example, the characteristic curve can be determined by polynomial approximation or by approximation by combining a plurality of straight lines.

In this embodiment, the characteristic of the data distribution is represented by a linear equation by the method of least squares instead the characteristic curve of the reference characteristic, which is rather complicated.

More specifically, the distribution of the reception signal levels is approximately expressed by a linear equation (Y=A * X+B), wherein the reception level (dB) is represented in the Y axis and the detected distances (m) to the object are represented in the X axis. Hereinafter, this linear equation is referred to as an approximate linear equation for reference (reference linear equation). The obtained reference is stored in the ROM (EEPROM) for actual detection of characteristic variation. This operation is performed at a manufacture of the vehicle for example.

The actual detection of the characteristic variation will be described.

For example, the radar apparatus 1 detects the distances to the preceding automotive vehicle (moving) and the reception signal levels a plurality of times and stores a plurality of sets of the data in the RAM 17c.

Next, the CPU 17a obtains measured distribution and the approximate liner equation (referred to as measured liner equation) from the stored data. Then, the measured linear equation is compared with the reference linear equation.

Figure 2:
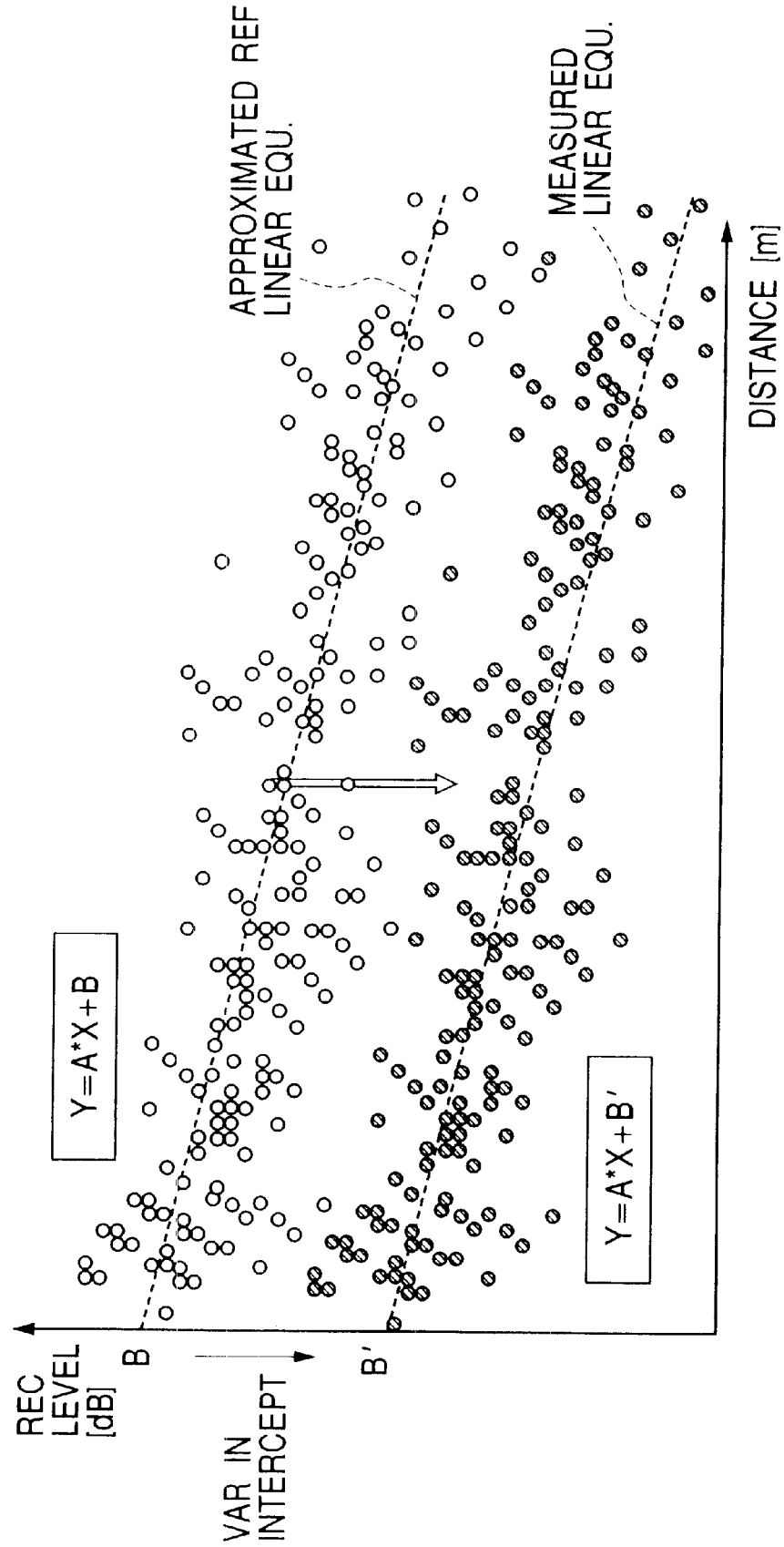
FIG. 2 is a graphical drawing illustrating variation in the sensor characteristic according to the present invention.

FIG. 2 shows an example of this comparison. In FIG. 2, the measured linear equation (chain line) obtained from the measured data (dots) is deviated from the reference linear equation (solid line) obtained from the reference data (circles). In this condition, the CPU 17a judges that the characteristic of the sensor 7 varies by the offset or difference (intercepts B-B'). That is, the CPU 17a calculates intercept B of the reference characteristic and the intercepts B' of the measured characteristic. Hereinafter, the Y intercepts B and B' are referred to as coefficients B and B'. When the difference is higher than a reference value, the CPU 17a judges that the characteristic of the radar apparatus 1 decreases considerably and outputs the result.

Figure 4:
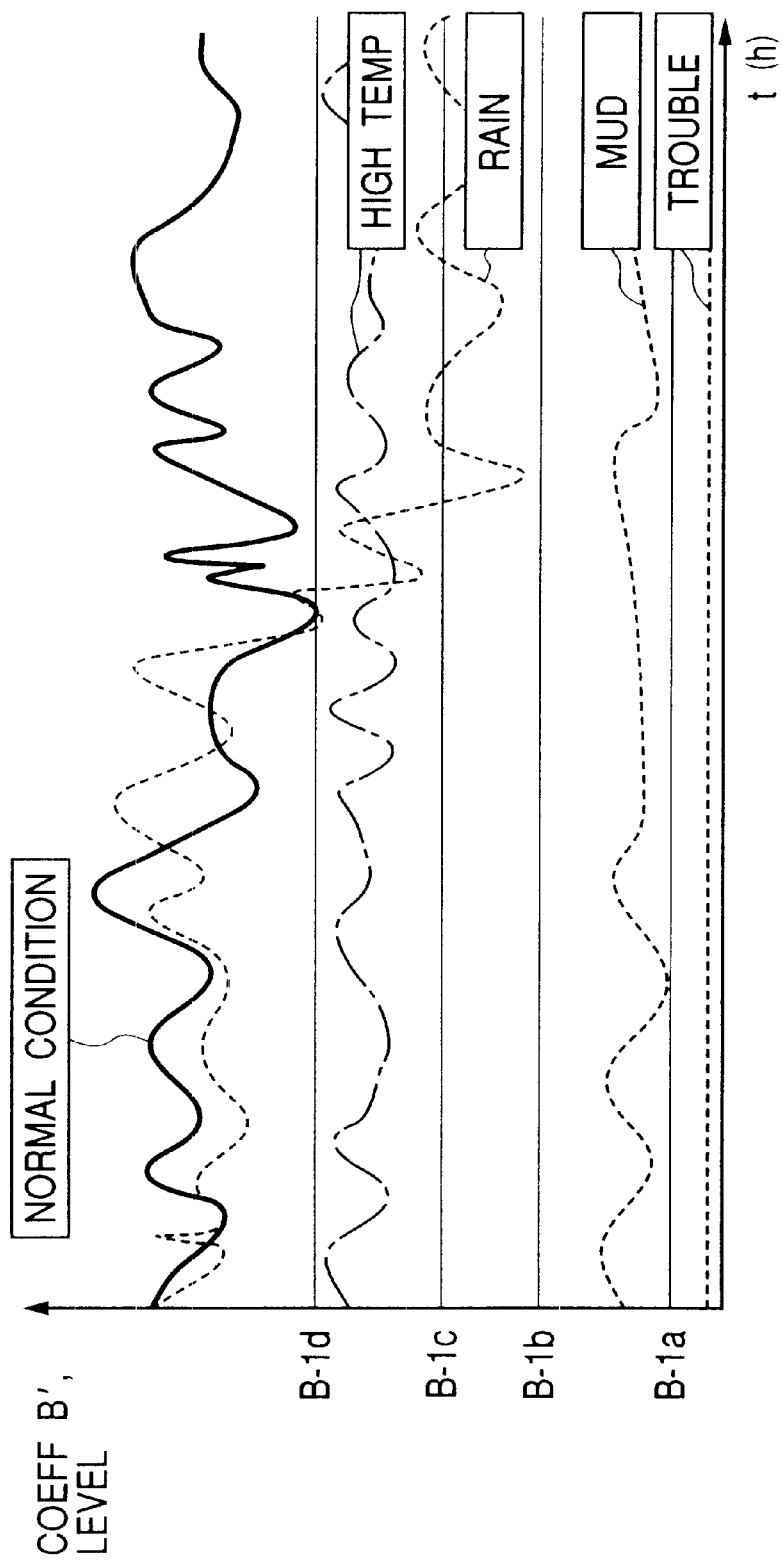
FIG. 4 is a graphical drawing illustrating classifying levels for judging the cause of the decrease in the sensor characteristic according to the first embodiment.

For example, the coefficient B' of the measured linear equation varies as shown in FIG. 4, in accordance with the condition of the sensor 7 and the circumference condition such as a high temperature of the sensor 7, rainy conditions, attachment of mud to the front of the sensor 7, or a trouble in the sensor 7. Thus, detecting the variation in the coefficient B' provides the variation detection in the characteristic of the sensor 7.

Moreover, in FIG. 4, on the axis of ordinate, judging levels B-1a, B-1b, B-1c, and B-1d are shown.

Then, the operation for detecting variation in characteristic executed by the microcomputer 17 will be described with reference to flow charts.

Figure 5:
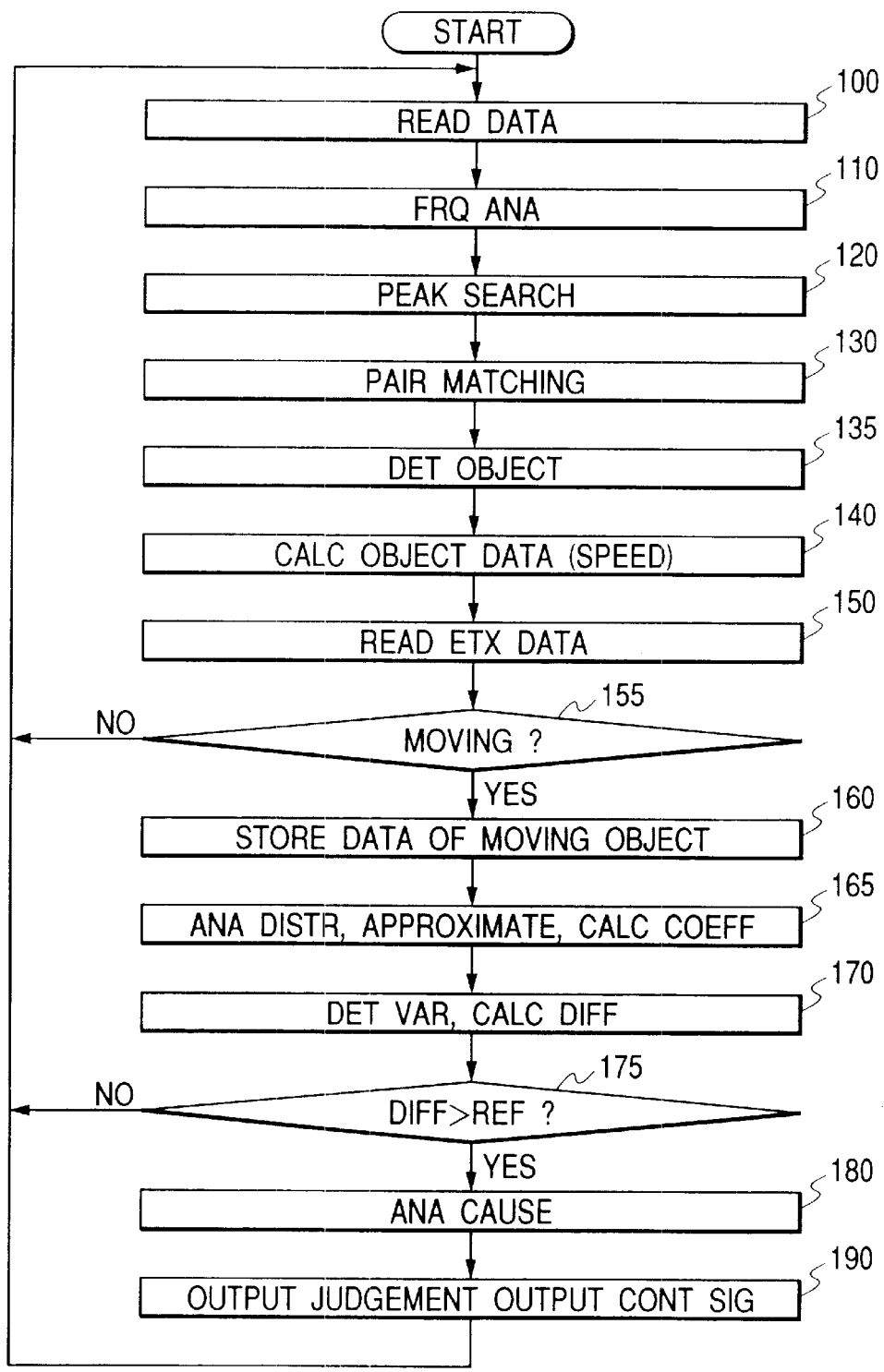
FIG. 5 depicts a flow chart showing the operation of the radar apparatus radar apparatus according to the first embodiment.

As shown in FIG. 5, the microcomputer 17 executes an activation processing to transmit the radar wave and read the digital data D from the a/d converter 15. That is, when the processing of this operation is started, the microcomputer 17 generates the activation signal C to activate the triangle wave generator 13 and the a/d converter 15.

Then, the transmitter 3 transmits the radar wave of which frequency is modulated in accordance with the modulation signal Sm from the triangles wave generator 13. In addition, the receiver 5 receives the radar wave reflected by an object and outputs the beat signal BS.

The a/d converter 15 converts the beat signal BS into the digital data D. The CPU 17a samples the digital data D and stores the sampled data in the RAM 17c. This processing is repeated at a predetermined interval to accumulate the data of the object.

In the following step 110, the CPU 17a executes frequency analyzing.

The CPU 17a selects one of data blocks in the RAM 17c and supplies the data of the selected block is supplied to the signal processing unit 19 which executes well-known FFT (Fast Fourier transformation) operation. In this operation, the data entered in the operation processing unit 19 are subjected to conventional window processing using a Hanning window or a triangular window or the like to suppress the side lobe appearing in the calculation of the fast Fourier transformation. The frequency spectrum data obtained through this FFT calculation are complex vectors in relation to frequency.

In the following step 120, peak searching is effected.

More specifically, the CPU 17a extracts the spectrum peak that is supposed to be the reflected wave from the object, from the spectrum of the beat signal BS obtained by the FFT operation. This operation is effected at the ascent and decent portions of the triangular wave signal.

More specifically, the CPU 17a detects all frequency components showing peaks on the frequency specturum (hereinafter referred to as peak frequency component) in accordance with absolute values of the complex vectors, that is, amplitudes of frequency components of those of complex vectors and the CPU 17a specifies the frequencies as the peak frequencies. Moreover, the method of detecting peaks is as follows:

For example, amounts of variation in amplitude with respect to frequency are successively obtained and an inverting place of frequency is obtained to specify the freuqency where it is supposed that there is a peak.

In the following step 130, the CPU 17a executes pair-matching (pairing) operation. This pair matching operation is that for determining the correct combinations of peak frequencies at the ascent and descent portions of the triangular wave.

More specifically, the CPU 17a compares the amplitudes of peak fluency components, that is, the power of peak frequency components, at the ascent portion with each of the powers of peak frequency components at the descent portion. Then, the peak frequency component having the same power at the ascent and descent portions are specified as a pair of the peak frequency components from the same object. This pair matching operation is more specifically disclosed in U.S. Pat. NO. 5,751,240, at FIG. 7 and the corresponding explanation in the specification. Thus, further explanation is omitted.

In step 135, each of powers of the peaks is compared with a threshold value TH to detect (determine) objects to be detected. Thus, the power corresponding to the proceeding vehicle considered to be large, so that this comparison provides detection (existence) of the target object (preceding vehicle) or other distinctive objects on the background.

In the following step 140, the CPU 17a executes operations for providing data regarding the object.

That is, the CPU 17a calculates the distance and relative speed to the objects with peak frequencies subjected to the pair matching operation in step 130. Next, the CPU 17a calculates an average level between the peak frequencies combined by the pair matching operation and the result is stored in relation with the result of distance and relative speed of the object. In this operation, either of the level at the ascent or descent portion can be used. However, the averaging provides stableness.

The calculation of distance and the relative speed is disclosed in U.S. Pat. NO. 5,751,240, at FIG. 5 thereof and the corresponding explanation in the specification. Thus, further explanation is omitted.

In the following step 150, the CPU 17a executes operation for reading external information.

More specifically, the CPU 17a reads a wiper power ON signal, the signal from the thermal sensor 20 indicating the temperature of the sensor 7, and a speed signal of the automotive vehicle.

In the following step 155, the CPU 17a judges whether each of the detected objects is moving. If there is the object that is moving, the processing proceeds to step 160. If there is not moving object, processing returns to step 100. More specifically, the CPU 17a detects whether the object is moving (automotive vehicle) or stopping (background) from the relative speed of the object. For example, if the object is approaching the sensor 7 at the same speed as the speed of this automotive vehicle which is represented by the speed signal supplied to the microcomputer 17, the CPU 17a judges the object is stopping. The CPU 17a judges that other objects are moving.

In the following step 160, the CPU 17a executes operation for storing data of the moving object. The CPU 17a repeatedly stores the distance of the moving object and the reception level as the data of the moving object.

In the following step 165, the CPU 17a determines and analyzes the distribution and calculates a coefficient B'. More specifically, the characteristic of the sensor 7 is approximated with a liner equation as mentioned above. Thus, the CPU 17a obtains the linear equation indicative of the data distribution (thus, it indicates the characteristic of the sensor 7 at the measuring instance) by the method of least squares with a plurality of sets of data of the reception level and the detected distances. Then, the CPU 17a calculates the coefficient B', i.e., the Y intercept B'.

In the following step 170, the CPU 17a compares the measured coefficient B with reference coefficient B to detect variation in the characteristic of the sensor 7. That is, the CPU 17a calculates the difference between the measured coefficient B' and the reference coefficient B.

In the following step 175, the CPU 17a judges whether the difference is higher than a reference. If the difference is higher than the reference, that is, there is considerable decrease in the characteristic of the sensor 7, processing proceeds to step 180 to analyze the cause. If the difference is not higher than the reference, that is, there is substantially no decrease in the characteristic of the sensor 7, processing returns to step 100.

Figure 6:
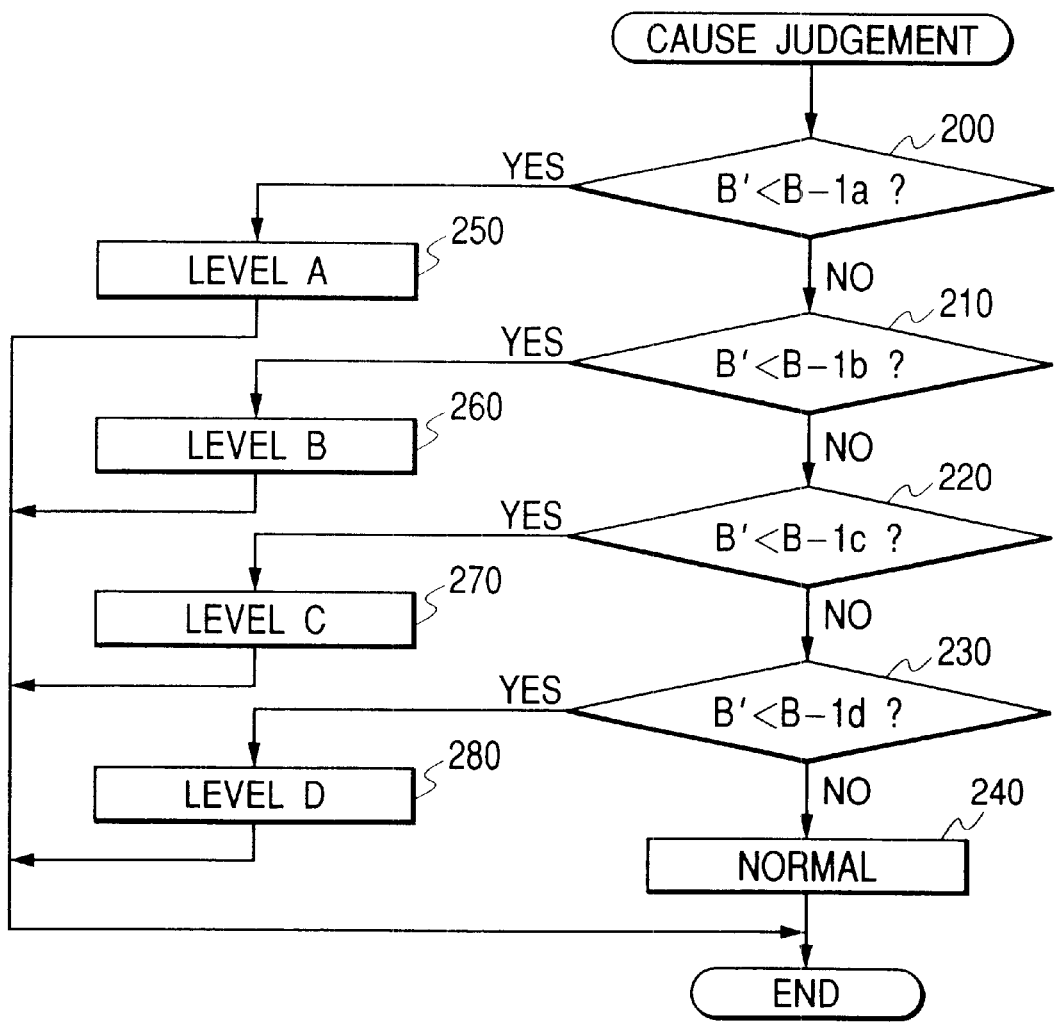
FIG. 6 depicts a flow chart showing the judging operation according to the first embodiment.

In the step 180, the CPU 17a analyzes cause judgment as shown by the flow chart in FIG. 6.

More specifically, the CPU 17a judges what is the cause resulting the variation of the sensor characteristic in accordance with combination between the distribution coefficient and various sensor signals.

In the following step 190, the CPU 17a outputs the result of the step 180.

For example, the CPU 17a outputs diagnosis data when there is a trouble in the sensor 7 or when it is judged that a foreign matter is attached to the front of the sensor 7. Moreover, if the CPU 17a judges that the deterioration in the characteristic of the sensor 7 is caused by bad weather, the CPU 17a sets a bad whether flag indicating bad weather in the RAM 17c. Moreover, the CPU 17a outputs a control signal for controlling a control unit mounted on the automotive vehicle.

Figure 14:
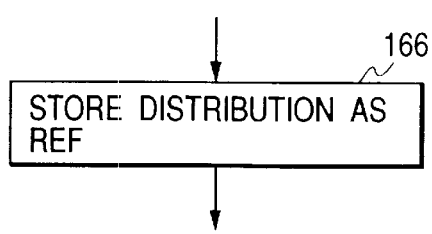
FIG. 14 depicts a portion of a flow chart according to the first embodiment.

The above-mentioned operation is provided for the actual measurement of the characteristic of the sensor 7. However, steps 100 to 165 can be used for determining the reference distribution of the characteristic of the sensor 7. Then, after step 165, the CPU 17a stores the data of the distribution, that is, the coefficient B in step 166 shown in FIG. 14 in the ROM (EEPROM 17b as the reference coefficient B.

Next, the cause judgment in step 180 will be described with reference to FIG. 6.

In step 200 in FIG. 6, the CPU 17a compares the coefficient B' obtained in step 170 with the least first judging level B-1a and judges whether the coefficient B' is lower than the first judging level B-1a. If the answer is yes, processing proceeds to step 250 and if the answer is no, processing proceeds to step 210.

The magnitudes of the judging levels are as follows:

The fist judging level B-1a<the second judging level B-1b <the third judging level B-1c<the fourth judging level B-1d.

In the step 250, the CPU 17a judges the condition of the sensor 7 is supposed to be in the level A condition shown in the table 1.

This table 1 shows a map for judging the cause of variation in the characteristic of the sensor 7 from operation condition of a wiper and the temperature of the sensor 7.

TABLE 1

|  | WIPER OFF NORMAL TEMP | WIPER ON NORMAL TEMP | WIPER OFF ABNORMAL TEMP | WIPER ON ABNORMAL TEMP |
|---|---|---|---|---|
| LEVEL A | TROUBLE IN SENSOR * | TROUBLE IN SENSOR | TROUBLE IN SENSOR | TROUBLE IN SENSOR |
| LEVEL B | ATTACH- ING * | ATTACH- ING | ABNORMAL TEMP | BAD WEATHER |
| LEVEL C | HOLD PREVIOUS JUDGING RESULT | BAD WEATHER * | ABNORMAL TEMPERATURE | BAD WEATHER |
| LEVEL D | HOLD PREVIOUS JUDGING RESULT | BAD WEATHER | ABNORMAL TEMP * | ABNORMAL TEMP |

In the condition of the level A, the CPU 17a judges that there is a trouble in the sensor 7 irrespective of the ON-OFF condition of the wiper and the temperature of the sensor 7 and sets the flag indicating this condition and temporary finish this processing. Here, the ON-OFF condition of the wiper is judged in accordance with set (1) and reset (0) conditions of a wiper flag. The automotive vehicle supplies the flag indicative of the operation of the wiper of automotive vehicle to the radar apparatus 1.

Figure 7:
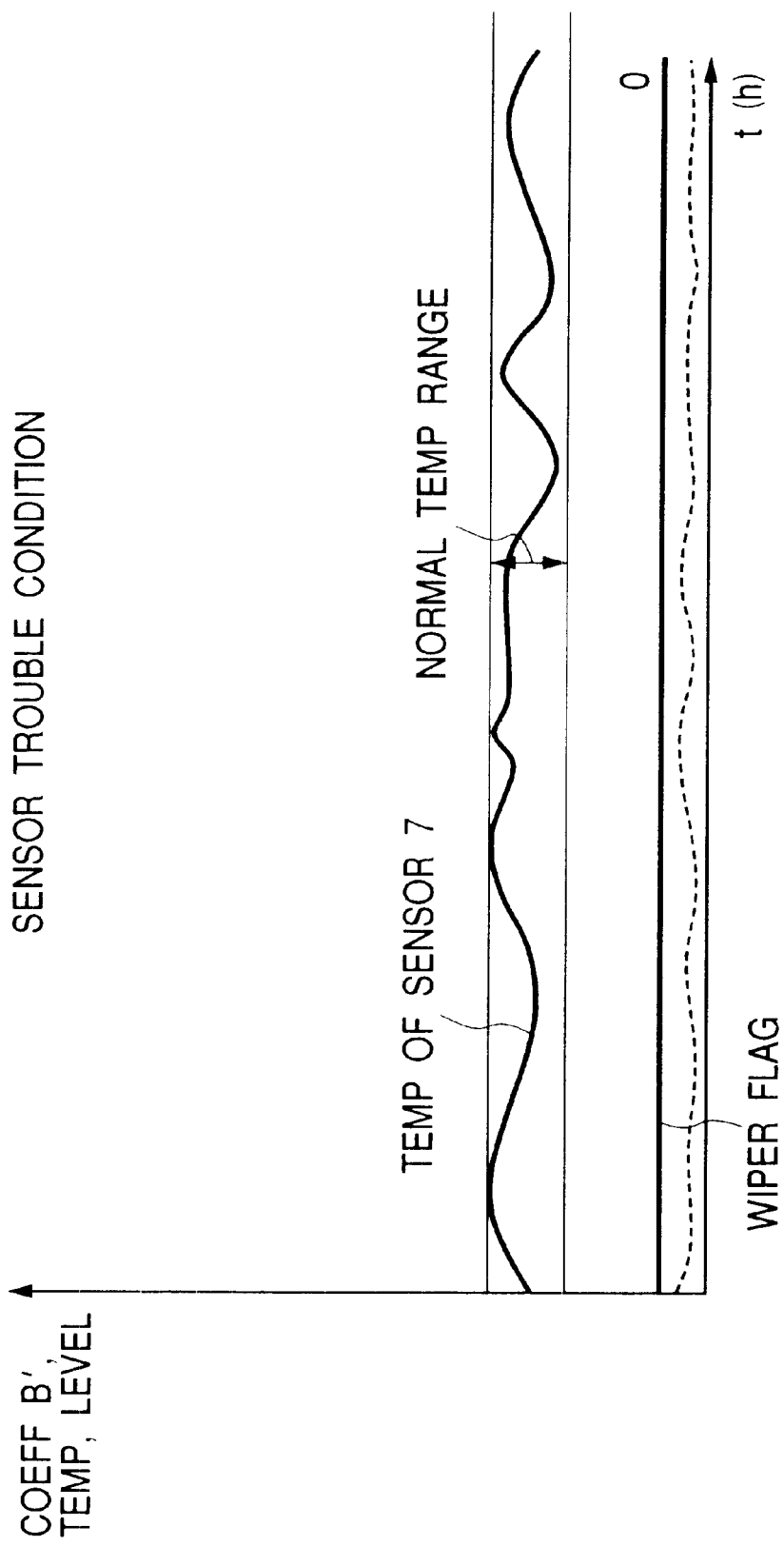
FIG. 7 is a graphical drawing illustrating variation in the sensor characteristic in the trouble condition according to the first embodiment.

That is, as shown in FIG. 7, if the temperature of the sensory 7 is within the normal temperature range and the flag of the wiper is "0" and the coefficient B' is near zero for a predetermined interval, it is supposed that there is a trouble in the sensor 7 from the various experimental results. Thus, the CPU 17a judges that there is a trouble in the sensor 7 (at the block marked by * in the row of the level A).

In this judgment, though it is not always proper to judge that there is the trouble in the sensor 7 in consideration of other possible conditions, the CPU 17a judges so because of the fail-safe judgment.

On the other hand, in step 210, the CPU 17a compares the coefficient B' with the second judging levels B-1b which is rather larger than the first judging level B-1a. That is, the CPU 17a judges whether the coefficient B' is lower than the second judging level B-1b. If the answer is yes, processing proceeds to step 260 and if the answer is no, processing proceeds to step 220.

In step 260, the CPU 17a judges that the condition of the sensor 7 is in the level B shown in table 1 because the coefficient B' is judged to be lower than the second judging level B-1b for the predetermined interval.

Figure 8:
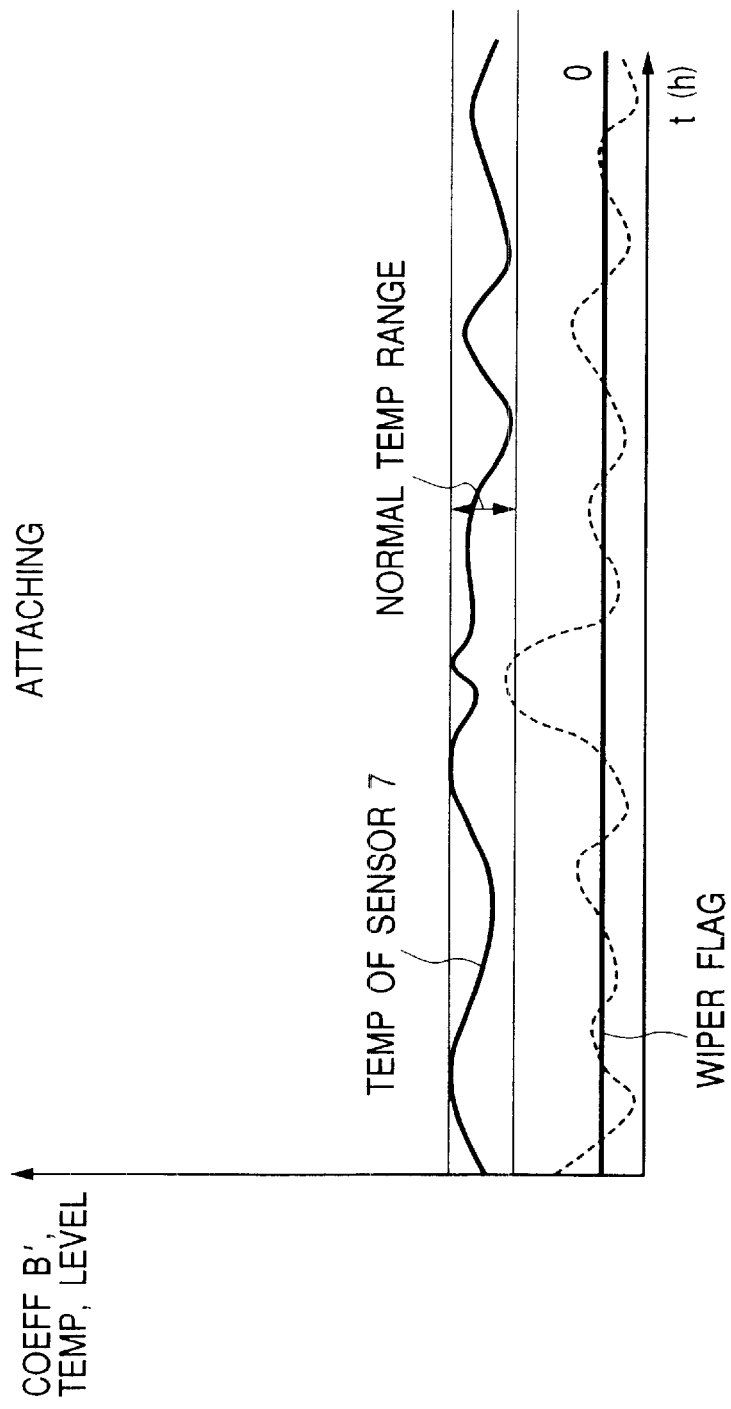
FIG. 8 is a graphical drawing illustrating variation in the sensor characteristic in the mud attaching condition according to the first embodiment.

In the condition of level B, the microcomputer 17 judges that a foreign matter attaches to the front of the sensor 7. This is because if the temperature of the sensor 7 is within the normal temperature range and the wiper flag is "0", when the coefficient B' is a low value for a predetermined interval, as shown in FIG. 8, probability of attaching of a forewing matter, such as mud, on the front of the sensor is considered to be high from our various experiments (the block marked by * in the row of the level B).

Moreover, in this embodiment, the CPU 17a also judges that there is attachment of a foreign matter on the front of the sensor 7 when the wiper flag is "1" and the temperature of the sensor 7 is normal in the level B condition because experiment shows the low level of the coefficient B is not caused from the temperature of the sensor 7. Moreover, if the wiper flag is "0" and the temperature of the sensor 7 is abnormal (outside normal range) in the level B condition, the CPU 17a judges that the low level of the coefficient B' is caused by an abnormal temperature of the sensor 7.

Further, when the wiper flag is "1" and the temperature of the sensor 7 is abnormal in the level B condition, the CPU 17a judges that the low level of the coefficient B is caused by bad whether, for example, rain. The analysis mentioned above is provided with various actual experiments in addition to the logical consideration.

On the other hand, in step 220, the CPU 17a compares the coefficient B' with the third judging level B-1c which is higher than the second judging level B-1b. That is, the CPU 17a judges whether the coefficient B' is lower than the third judging level B-1c. If the answer is yes, processing proceeds to step 270 and if the answer is no, processing proceeds to step 230.

In step 270, the CPU 17a judges that the condition of the sensor 7 is in the level C shown in table 1 because the coefficient B' is judged to be lower than the third judging level B-1c.

Figure 9:
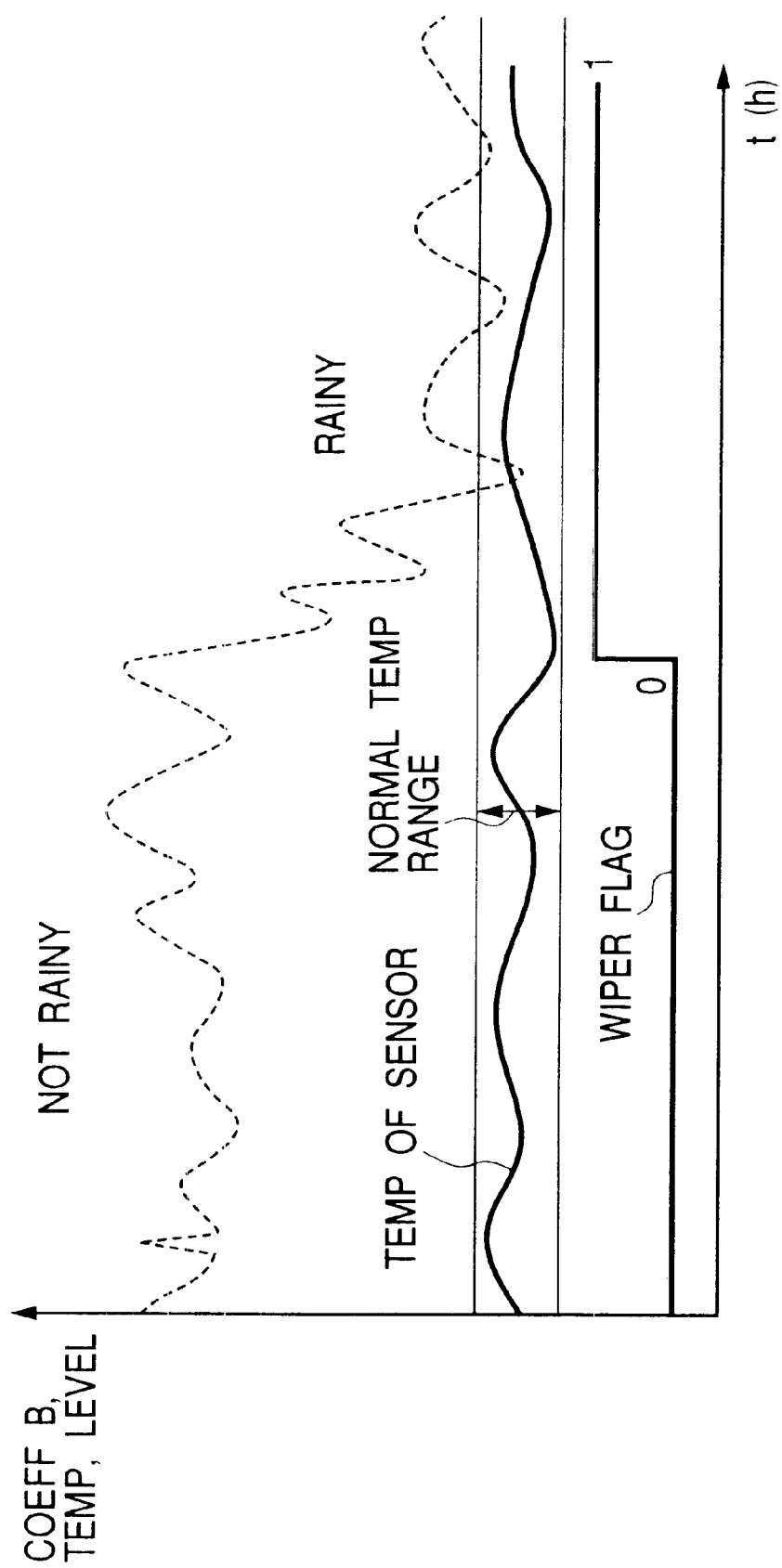
FIG. 9 is a graphical drawing illustrating variation in the sensor characteristic in the rainy condition according to the first embodiment.

FIG. 9 shows variation of the coefficient B' when it begins to rain. In the rainy condition, the coefficient B' decreases. Thus, if the coefficient B' is lower than the judging level B-1c for the predetermined interval when the temperature of the sensor 7 is within the normal range and the wiper flag is "1", the CPU 17a judges that the low value of the coefficient B' is due to bad weather (the block marked with * at the row of the level C).

The decrease in the coefficient B' due to bad weather does not result from a trouble in the sensor 7 itself, so that the CPU 17a judges that the sensor 7 is in the normal condition.

In the level C, when the wiper flag is "zero" and the temperature is in the normal range, it is difficult to specify the cause, so that the preceding judgment is held. Moreover, when the wiper flag is "zero" and the temperature of the sensor 7 is in the abnormal range for the predetermined interval, the CPU 17a judges that decrease in the coefficient B' is caused by abnormal temperature. Further, if the wiper flag is "1" and the temperature of the sensor 7 is in the abnormal range for the predetermined interval, the CPU 17a judges that decrease of the coefficient B' is caused by bad whether.

On the other hand, in step 230, the CPU 17a compares the coefficient B' with the fourth judging level B-1d which is higher than the third judging level B-1c, i.e., the highest judging level. That is, the CPU 17a judges whether the coefficient B is lower than the fourth judging level B-1d. If the answer is yes, processing proceeds to step 280 and if the answer is no, processing proceeds to step 240.

In step 280, the CPU 17a judges that the condition of the sensor 7 is in the level D shown in table 1 because the coefficient B is judged to be lower than the fourth judging level B-1d.

Figure 10:
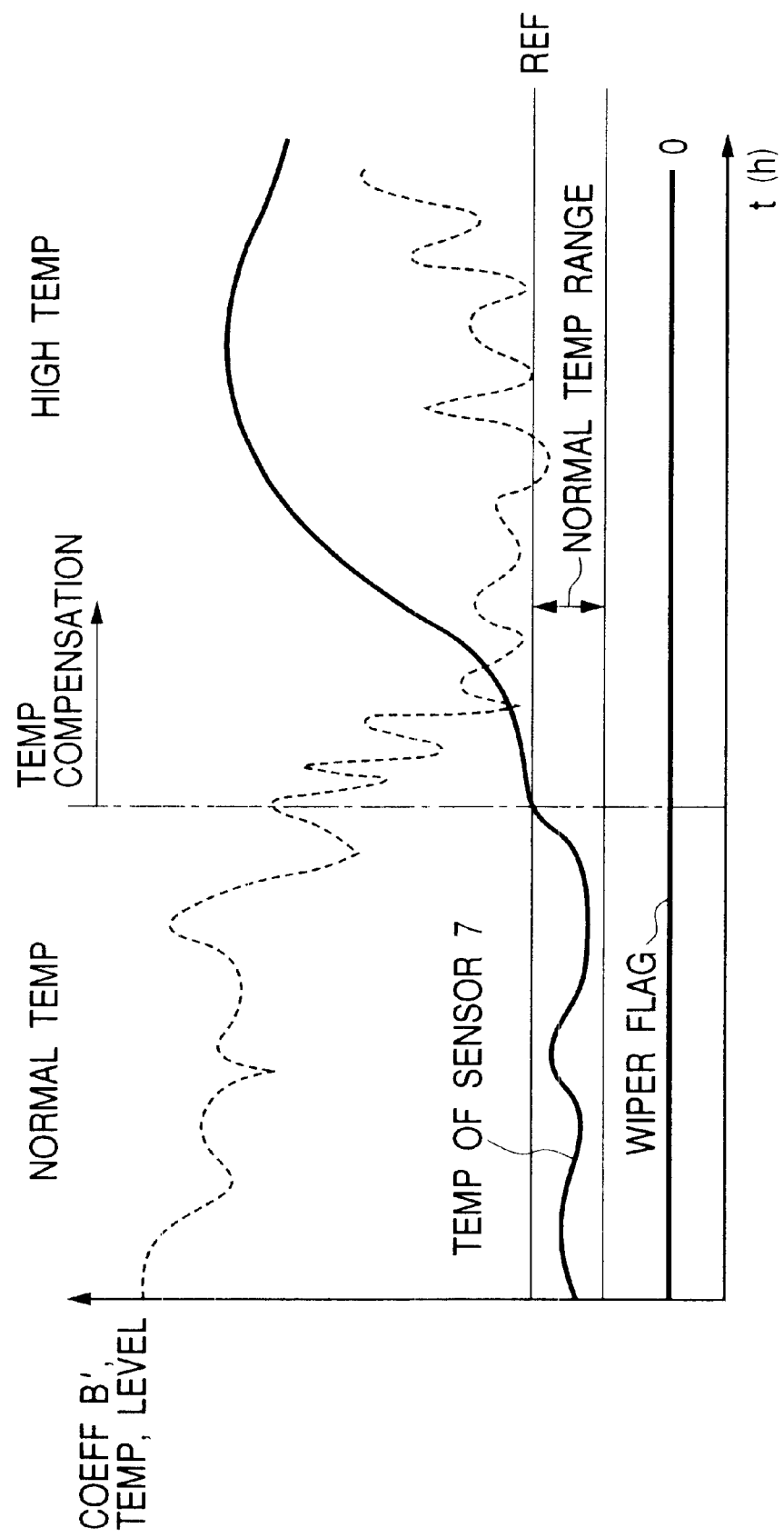
FIG. 10 is a graphical drawing illustrating variation in the sensor characteristic in the high temperature condition according to the first embodiment.

FIG. 10 shows variation of the coefficient B' when the temperature of the sensor 7 increases. The characteristic of the sensor 7 decreases in the high temperature condition of the sensor 7. In FIG. 10, the coefficient B' decreases though the wiper flag is "0" but the temperature of the sensor 7 increases. This abnormal condition (high temperature) can be judged in accordance with the abnormal temperature of the sensor 7. Thus, the CPU 17a judges that the low value of the coefficient for the predetermined interval is caused by the abnormal temperature of the sensor 7 when the sensor temperature is higher than a reference value and the wiper flag is "0" in the level D condition (the block in the row of the level D, marked with "*").

In the case of decrease in the characteristic of the sensor 7 due to abnormal temperature, the CPU 17a judges that the sensor 7 itself is in the normal condition because the abnormal condition is due to the external (outside the sensor 7) causes.

Thus, the CPU 17a executes temperature compensation to the sensor reception signal. For example, with increase in the temperature of the sensor 7, the coefficient B' decreases. Then, the CPU 17a multiplies the value of the reception level by a predetermined value. The CPU 17a can execute the operations in the radar detection apparatus with the multiplied reception levels.

In the level D condition, when the wiper flag is "zero" and the temperature of the sensor 7 is in the normal condition for the predetermined interval, the CPU 17a holds the preceding the judging result because it is difficult to specify the cause. Moreover, when the wiper flag is "1", and the temperature of the sensor 7 is at the normal temperature range for the predetermined interval, the CPU 17a judges that the decrease of the coefficient B' is caused by bad weather. Further, when the wiper flag is "1" and the temperature of the sensor 7 is at the abnormal temperature range, the CPU 17a judges that the decrease of the coefficient B' is caused by abnormal temperature, i.e., high temperature because probability of high temperature of the sensor 7 is supposed to be high.

On the other hand, in step 240, the CPU 17a sets a flag indicating that the sensor 7 is in the normal condition because the sensor 7 is in the normal condition and stable and processing temporary ends.

The judging levels B-1a to B-1d are fixed. However, these values may be changed in accordance with the reference coefficient B.

According to the structure mentioned above, this embodiment provides following advantage effects.

In this embodiment, a plurality of sets of the detected distance to the object and the reception level are stored with relation therebetween and the distribution of the plurality of sets of detected distance and reception levels is approximated with a linear equation. The CPU 17a detects the variation in the characteristic of the sensor 7 from the Y intercept of the linear equation.

Thus, variation in the characteristic of the sensor 7 can be detected without reference reflector within the radar apparatus 1, so the radar apparatus 1 can be miniaturized. Moreover, the calculation in the above-mentioned operation is easy because the distribution is approximated with a linear equation.

Moreover, in this embodiment, the cause for decrease in the coefficient B' is judged in accordance with the judging map shown in table 1 with the wiper signal (flag) and the temperature signal. Thus, the causes for variation in the characteristic of the sensor 7 can be recognized precisely.

Moreover, it is possible to detect the same object for a relative long interval, so that favorable distribution of the reception levels can be detected without disturbance.

Further, it is also possible that the variation in the characteristic of the sensor 7 can be judged using data of the object which is stopping on a road or can be judged using only the data of the object stopping on the road.

Second Embodiment

The radar apparatus according to a second embodiment has substantially the same structure as that of the first embodiment. The difference is that the CPU 17a changes the detection threshold value TH for detecting the object when the CPU 17a detects the variation in the characteristic of the sensor 7.

Figure 11:
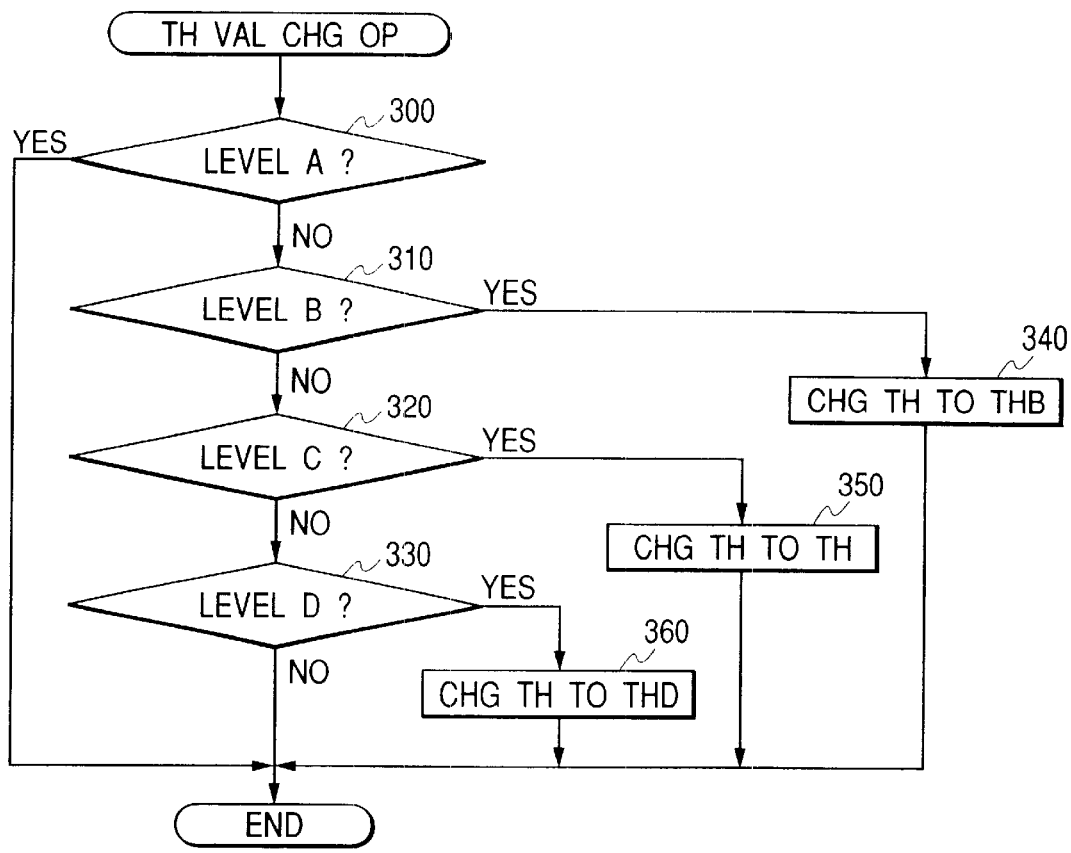
FIG. 11 depicts a flow chart showing the threshold value changing operation according to a second embodiment.

FIG. 11 shows this operation. The CPU 17a judges whether the coefficient B' is in the level A condition. If the answer is yes, that is, the sensor 7 is judged to be in trouble condition. Thus, there is no way to recover the condition, so that processing ends. On the other hand, if the answer is no, processing proceeds to step 310.

In step 310, the CPU 17a judges whether the coefficient B' is in the level B condition. If the answer is yes, processing proceeds to step 340 and if the answer is no, processing proceeds to step 320.

In step 340, the CPU 17a sets, i.e., changes, the detection threshold value TH to threshold value THB in accordance with the level B condition (B-1b) and processing temporary ends.

In this operation, the level B condition is caused by attaching of mud for example, so that the reception level of the sensor 7 considerably decreases. Then, decreasing the detection threshold value in accordance with the level B condition enables detecting the object with the lowered threshold value THB.

On the other hand, in step 320, the CPU 17a judges whether the coefficient B' is in the level C condition. If the answer is yes, processing proceeds to step 350 and if the answer is no, processing proceeds to step 330.

In step 350, the CPU 17a sets, i.e., changes, the detection threshold value TH to the threshold value THC in accordance with the level C condition and processing temporary ends.

In this operation, the level C condition is caused by raining for example, so that the reception level of the sensor 7 slightly decreases. Then, the CPU 17a slightly decreases the detection threshold value in accordance with the level C condition. This operation enables the measurement of the object by the radar apparatus.

In step 330, the CPU 17a judges whether the coefficient B' is in the level D condition. If the answer is yes, processing proceeds to step 360 and if the answer is no, processing temporary ends.

In step 360, the CPU 17a changes, i.e., the present detection threshold value to a threshold value THD corresponding to the level D condition and processing temporary ends.

In this operation, the level THD condition is caused by increase in the temperature of the sensor 7 for example, so that the reception level of the sensor 7 slightly decreases. Then, the CPU 17a slightly decreases the detection threshold value TH in accordance with the level D condition. This operation enables the measurement of the object by the radar apparatus 1.

As mentioned above, when the characteristic of the sensor 7 varies, the detection threshold value TH is changed. Thus, though the measurement of the object is impossible, this operation enables to store the data of the object and thus, judging the circumstance of the automotive vehicle can be provided with accuracy.

Third Embodiment

The radar apparatus according to a third embodiment has substantially the same structure as that of the first embodiment. The difference is that the CPU 17a changes the control mode of the automotive vehicle mounting the radar apparatus. That is, the CPU 17a supplies, to the control unit of the automotive vehicle mounting this radar apparatus 1, the control mode signal in accordance with the condition detected by the radar apparatus or the like through the I/O circuit 21.

Figure 12:
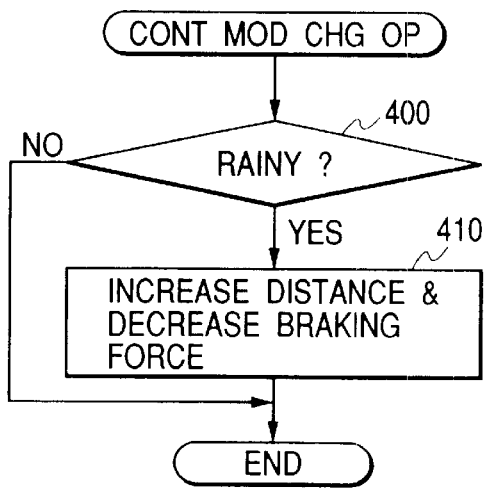
FIG. 12 depicts a flow chart showing the control mode changing operation according to a third embodiment.

The CPU 17a changes the control mode when the CPU 17a detects the variation in the characteristic of the sensor 7 by the operation shown in FIGS. 5 and 6 as shown by the flow chart in FIG. 12.

In step 400, the CPU 17a judges whether it is rainy (bad weather). If the answer is yes processing proceeds to step 410 and the answer is no, processing temporary ends.

In step 410, if automatic cruising for controlling the distance between this automotive vehicle and the preceding vehicle is effected, the CPU 17a supplies the control mode signal commanding of increase in the distance between this vehicle and the preceding vehicle to the control unit (not shown) for this automotive vehicle. If a braking assisting operation is effected in this automotive vehicle, the CPU 17a supplies a control mode signal commanding decrease in braking force to prevent slipping (decrease in the excessive braking force). Further, the CPU 17a supplies a mode control signal indicating of starting condition of anti-skidding control such that the anti-skid control is started at the earlier timing to prevent slipping (for example, the slip rate is decreased).

As mentioned above, when the characteristic of the sensor 7 varies, the control condition (control mode) of the automotive vehicle mounting the radar apparatus 1, so that safety driving is provided.

Fourth Embodiment

The radar apparatus according to a fourth embodiment has substantially the same structure as that of the first embodiment. The difference is that the characteristic of the sensor 7 is judged with a coefficient A' indicative of inclination of the linear equation instead the Y intercept.

Figure 13:
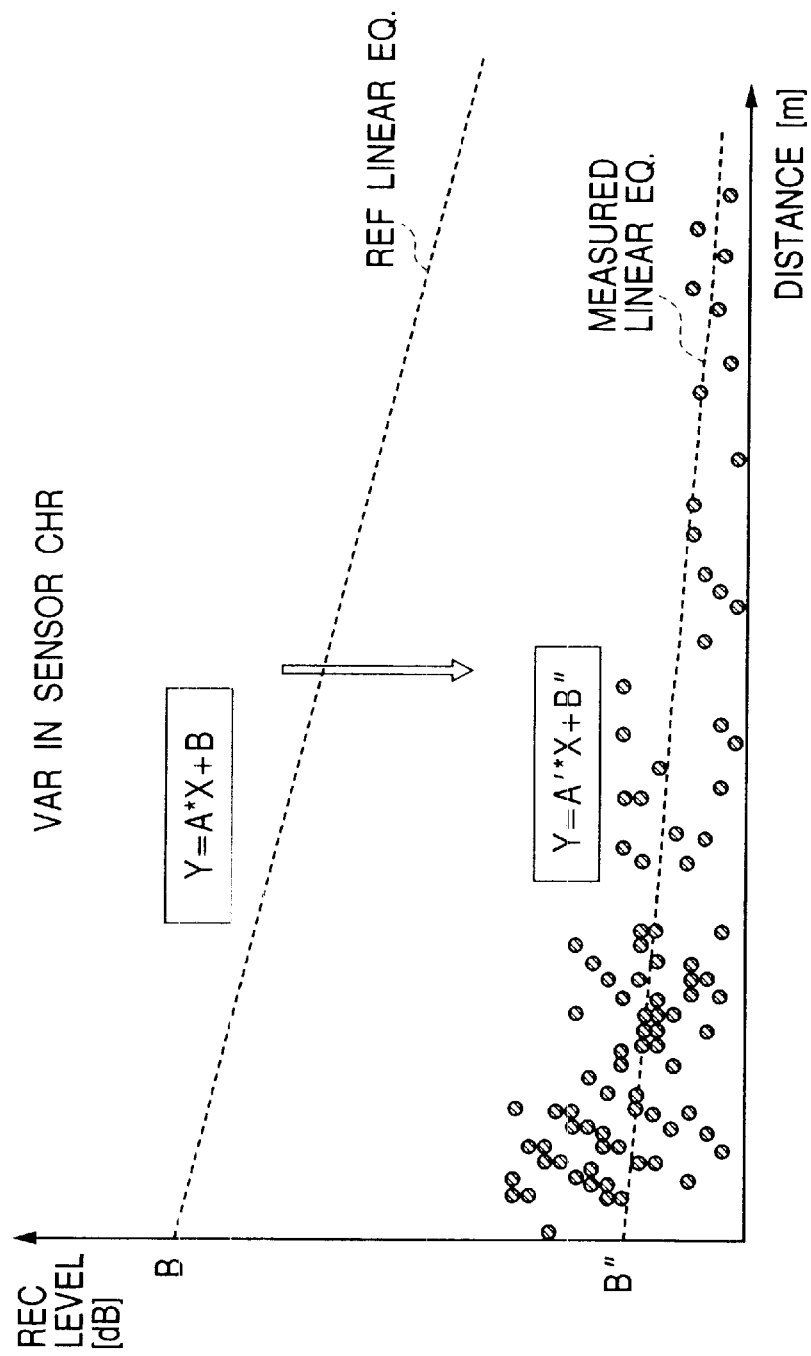
FIG. 13 is a graphical drawing illustrating variation in the sensor characteristic according to a fourth embodiment.

As shown in FIG. 13, the reference linear equations (Y=A*X+B) indicative of the reference data distribution and the measured linear equation (Y=A'* X+B''') indicative of the actually measured data distribution are obtained. When the characteristic of the sensor 7 varies, not only the intercepts are different with each other but also the coefficient A' indicative of inclination of the linear equations are different with each other.

Thus, an allowable range of the inclination A' is set and if the coefficient A' is outside the allowable range, the CPU 17a judges there is some trouble. Then, the CPU 17a stops the judging operation for judging the variation in the characteristic of the radar apparatus 1.

Thus, the judging operation in the first third embodiments are not executed if the inclination A' is outside the allowable range, so that the accuracy of the judgment increases.

As mentioned above, according to the present invention, the radar wave reflected by a proceeding automotive vehicle is received. The distance and the reception level of the received radar wave are repeatedly stored with relation therebetween. The reception levels are plotted with respect to distance. The distribution of the receptions levels is approximated with a linear equation as the characteristic of the radar apparatus. Variation in the distribution, that is, Y intercept of the linear equation represents the variation of the characteristic of the radar apparatus. A reference characteristic of the radar is measured with changing the distance to the preceding reflective object and the measured characteristic is measured with a moving preceding vehicle during actual traveling. The reference Y intercept is compared with the measured Y intercept to detect the deviation. Further, the divination amount or the measured value is classified to judge the cause of decrease in the characteristic using conditional signals.

There are various modifications of this invention. For example, the FMCW type of the radar apparatus 1 was described in the above-mentioned embodiments. However, this invention is applicable to other type of radars such as CW radars.

As mentioned in the first embodiment, the recording medium for storing the program for operating the radar apparatus according to the invention can be provided with the recording medium such as an EPROM (Erasable ROM) or EEPROM (Electrically Erasable ROM), or a floppily disc with a drive unit, a hard disc drive unit, an optical disc with a dive unit.

What is claimed is:

1. A method of detecting a characteristic of a radar apparatus for a vehicle on the basis of data of an object obtained by said radar apparatus, said data including distance data of said object and a level of a radar signal reflected by said object and received by said radar apparatus, comprising the steps of:

(a) repeatedly storing said distance data to said object and said level of said radar signal with relation therebetween; and (b) detecting said characteristic of said radar apparatus from variation in distribution of said repeatedly stored distance data and levels of said radar signal.

2. A method as claimed in claim 1, further comprising the step of:

(c) detecting variation of said characteristic of said radar apparatus by comparing said distribution with a reference distribution.

3. A radar apparatus characteristic detection apparatus detecting a characteristic of a radar apparatus for a vehicle on the basis of data of an object obtained by said radar apparatus, said data including distance data of said object and a level of a radar signal reflected by said object and received by said radar apparatus, comprising:

storing means for repeatedly storing said distance data and said level with relation therebetween; and detecting means for detecting said characteristic of said radar apparatus from variation in distribution of said repeatedly stored distance data and levels.

4. A radar apparatus characteristic detection apparatus as claimed in claim 3, further comprising:

variation detection means for detecting variation of said characteristic of said radar apparatus, wherein said variation detection means includes comparing means for comparing said distribution with a reference distribution.

5. A radar apparatus characteristic detection apparatus as claimed in claim 4, further comprising:

means for determining a characteristic curve in accordance with said distribution and said comparing means compares said distribution with a reference characteristic curve.

6. A radar apparatus characteristic detection apparatus as claimed in claim 5, further comprising:

approximating means for approximating said distribution to provide a liner equation.

7. A radar apparatus characteristic detection apparatus as claimed in claim 6, further comprising:

calculation means for calculating an intercept of said linear equation and a reference intercept of a reference linear equation of said reference distribution, wherein said comparing means compares said intercept with said reference intercept.

8. A radar apparatus characteristic detection apparatus as claimed in claim 4, further comprising: input means for inputting a signal from said vehicle.

9. A radar apparatus characteristic detection apparatus as claimed in claim 8, further comprising: judging means for judging whether said variation of said characteristic of said radar apparatus is caused by the radar apparatus itself or an external reason in accordance with said signal inputted from said vehicle.

10. A radar apparatus characteristic detection apparatus as claimed in claim 3, further comprising: judging means for judging that the object is moving in accordance with data from said radar and said storing means and said detection means are operated when said object is judged to be moving.

11. A radar apparatus characteristic detection apparatus as claimed in claim 4, further comprising: recognizing means for recognizing said object in accordance with said data from said radar with a threshold value, and changing means for changing said threshold value when variation of said characteristic of said radar apparatus is detected.

12. A radar apparatus characteristic detection apparatus as claimed in claim 4, further comprising:

generating and outputting means for generating and outputting a mode control signal when said second detecting means detects said variation.

13. A recording medium for recording processing in detecting a characteristic of a radar apparatus for a vehicle on the basis of data of an object obtained by said radar apparatus, said data including distance data of said object and a level of a radar signal reflected by said object and received by said radar apparatus, said processing including the steps of:

(a) repeatedly storing said distance data to said object and said level of said radar signal with relation therebetween; and (b) detecting said characteristic of said radar apparatus from variation in distribution of said repeatedly stored distance data and levels of said radar signal.

14. A recording medium as claimed in claim 13, wherein said processing further comprising the step of:

(c) detecting variation of said characteristic of said radar apparatus by comparing said distribution with a reference distribution.

15. A method as claimed in claim 1, further comprising the step of: generating a control signal in accordance with said detected characteristic.

16. A method as claimed in claim 1, further comprising the steps of:

detecting a peak level of spread spectrum and comparing said peak level with a threshold value to detect said object;

detecting a relative speed of said object when said peak level is higher than said threshold value; and determining whether said data of said object is subjected to said steps (a) and (b) in accordance with the result of said step of detecting said peak level.

17. A method as claimed in claim 2, further comprising the steps of:

effecting said step (a) and (b); and storing said distribution as said reference distribution.

* * * * *

UNITED STATES PATENT AND TRADEMARK OFFICE
CERTIFICATE OF CORRECTION

PATENT NO.   : 6,445,335 B1
DATED        : September 3, 2002
INVENTOR(S)  : Yukimasa Tamatsu It is certified that error appears in the above-identified patent and that said Letters Patent is hereby corrected as shown below:

<u>Title page, Item [54] and Column 1, line 1,</u>
Correct the title of the patent "METHOD OF DETECTING A RADAR CHARACTERISTIC, A RADAR CHARACTERISTIC, DETECTION APPARATUS, AND A RECORDING MEDIUM RECORDING DATA FOR DETECTING A RADAR CHARACTERISTIC" to be -- "METHOD OF DETECTING A RADAR CHARACTERISTIC, A RADAR CHARACTERISTIC DETECTION APPARATUS, AND A RECORDING MEDIUM RECORDING DATA FOR DETECTING A RADAR CHARACTERISTIC" --

Signed and Sealed this

Ninth Day of September, 2003

JAMES E. ROGAN
*Director of the United States Patent and Trademark Office*